April 9, 1935.     C. C. STEVENS     1,996,841

SEPARATOR

Filed May 6, 1931

INVENTOR:
CLARENCE C. STEVENS,

BY

HIS ATTORNEY.

Patented Apr. 9, 1935

1,996,841

UNITED STATES PATENT OFFICE 1,996,841

SEPARATOR

Clarence C. Stevens, Forestville, Conn., assignor, by mesne assignments, to General Motors Corporation, Detroit, Mich., a corporation of Delaware Application May 6, 1931, Serial No. 535,387

8 Claims. (Cl. 308—201)

This invention relates to separators and the method of making and comprises all of the features and aspects of novelty herein disclosed. An object of the invention is to provide an improved separator for antifriction bearings and an improved method of making it. Another object is to provide a separator especially adapted for high speed bearings and one that has antifriction qualities while being strong and efficient and capable of economical production and accurate formation. Still another object is to provide a separator of composite construction wherein the portions needing most strength have the stronger material.

To these ends and also to improve generally upon devices of this character, the invention consists in the various matters hereinafter described and claimed. In its broader aspects, the invention is not necessarily limited to the specific things herein shown by way of illustration wherein Fig. 1 is a sectional view of a mold.

Figures 2, 3:
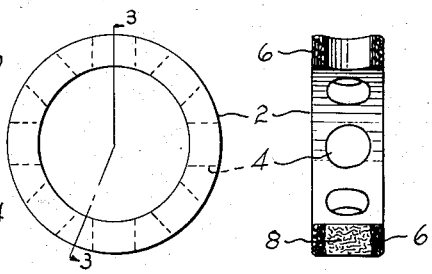
Fig. 2 is a side view of a separator.
Fig. 3 is a section on the line 3—3 of Fig. 2.
Figure 4:
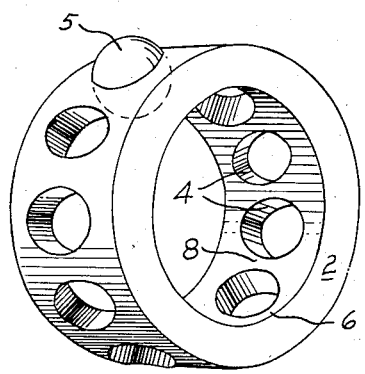
Fig. 4 is a perspective view of the separator.

In Figs. 2, 3 and 4, the numeral 2 indicates a composite ring which forms the body of the molded separator. The ring has a series of openings 4 for rolling elements herein indicated as balls 5. The side walls of the body are preferably composed of continuous rings 6 of laminated fabric, such as canvas or linen, impregnated with bakelite or similar moldable material while those portions of the body which compose the partitions 8 between the openings are preferably composed of similar material in macerated or finely divided form.

Figure 1:
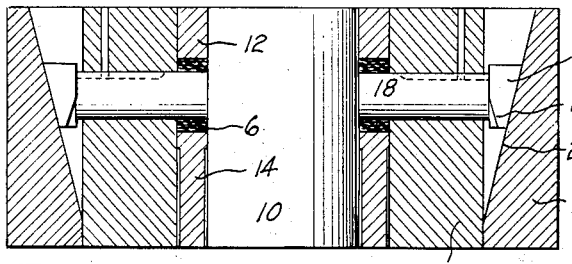

A suitable mold is indicated in Fig. 1 and comprises a cylindrical core 10, an upper ring 12, a lower ring 14, and an outer ring 16. A circular series of plungers or plugs 18 which form the openings for the rolling elements slide in radial openings of the outer ring 16. Heads 20 on the plungers desirably have cam faces engaged by a tapered face 22 on a ring 24 so that relative axial movement between the ring and the mold will force the plungers radially inwards. Cam faces 26 on the heads are provided so that an externally tapered ring (not shown) will subsequently withdraw the plungers after the molding operation. One set of laminated rings 6 is laid on the lower ring 14 and the plungers are advanced. Macerated or finely divided material for the partitions 8 is then placed in the mold and followed by the other set of laminated rings 6. Upon adding the upper ring 12, the material is subjected to the usual pressure molding and curing process to produce the finished separator. The line of demarcation between the partition material at 8 and the side walls at 6 may become somewhat irregular but this is advantageous in that it produces a better bond.

Figures 5, 6:
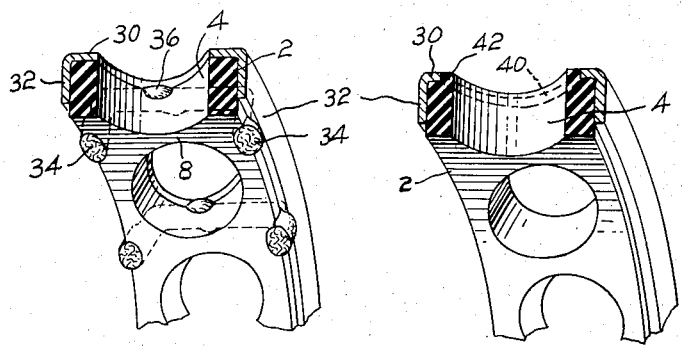
Figs. 5, 6 and 7 are perspective views, partly in section, of various modifications.

In the modification shown in Fig. 5, the separator is reinforced by a metal shell 30 having side flanges 32, the shell enclosing the molded material and a series of wicks 34. The ends of the wicks terminate approximately at the inner diameter of the separator and extend around to the outside of the separator inside of the reinforcing shell. The wicks are embedded in the partitions 8 but a short portion of each at 36 breaks through and is exposed at the ball pockets 4. The shell stiffens the separator and thus allows the use of weaker moldable material. The wicks take up lubricant, as from the bearing cone which they may engage, and distribute it to the openings and the rolling elements.

In the modification shown in Fig. 6, the shell 30 has openings 40 larger than the openings 4 so that the rims of the openings 40 cannot touch the rolling elements. In molding, the material runs into the openings 40 forming extensions 42 which line the rims of the openings 40 and anchor the shell.

Figure 7:
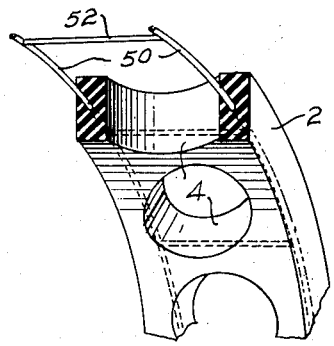

In the modification shown in Fig. 7, the separator is reinforced by metal hoops 50 embedded therein and connected by cross pieces 52.

Bakelite or a fabric impregnated with it is the preferred kind of material as it is strong and has antifriction qualities.

I claim:

1. In a separator for antifriction bearings, a ring having a series of openings for rolling elements, the portions of the rings between the openings being composed of macerated fabric impregnated with bakelite or the like and the portions of the ring at the opposite sides of the openings comprising laminated rings of similar material; substantially as described.

2. In a separator for antifriction bearings, a ring comprising a reinforcing shell having a series of openings for rolling elements, the rims of the openings in the shell having clearance with the rolling elements, and a ring body of antifriction moldable material fitting in the shell and peripherally enclosed thereby, the body having a series of openings for the rolling elements and extensions lining the rims of the openings in the shell; substantially as described.

3. In a separator for antifriction bearings, a composite ring having a series of openings for rolling elements, one part comprising a reinforcing shell with side flanges and the other being a ring body of molded bakelite or the like peripherally enclosed by the shell and confined laterally by the flanges, the shell having a series of openings with the rims thereof clearing the rolling elements and the body having openings and extensions lining the rims of the openings in the shell and anchoring the body to the shell; substantially as described.

4. In a separator for antifriction bearings, a ring having a series of openings for rolling elements, the ring having annular side walls and connecting partitions, and wicks embedded in the partitions and having side portions thereof breaking through the partitions to the openings; substantially as described.

5. In a separator for antifriction bearings, a ring having a body portion with a series of openings for rolling elements, and a series of lubricating wicks extending crosswise of the ring between the rolling elements, the wicks being embedded in the body portion and each extending to the edge of one of the openings; substantially as described.

6. In a separator for antifriction bearings, a ring having a body portion with a series of openings for rolling elements, a series of lubricating wicks embedded in the body portion, one portion of each wick being exposed at the edge of an opening to lubricate the rolling element and another portion being exposed at one of the peripheral surfaces of the ring; substantially as described.

7. In a separator for antifriction bearings, a composite ring having a series of openings for rolling elements, one part comprising a body portion of moldable material and the other part comprising a reinforcing shell of metal, and lubricating wicks between the body and the shell and exposed at the edges of the openings; substantially as described.

8. In a separator for antifriction bearings, a composite ring having a series of openings for rolling elements, one part comprising a reinforcing shell with side flanges and the other part being a body of antifriction material enclosed within the shell and confined laterally by the flanges, and lubricating wicks exposed at the edges of the openings, the wicks passing between a side flange of the shell and the adjacent side of the body and terminating adjacent to the inner periphery of the ring; substantially as described.

CLARENCE C. STEVENS.